(12) United States Patent
Ihara

(10) Patent No.: US 6,266,813 B1
(45) Date of Patent: Jul. 24, 2001

(54) DIGITAL BROADCASTING SYSTEM AND DIGITAL BROADCASTING METHOD

(75) Inventor: Kiichi Ihara, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/309,214

(22) Filed: May 10, 1999

(30) Foreign Application Priority Data

May 11, 1998 (JP) .................................. P10-126954

(51) Int. Cl.[7] ...................................................... H04N 7/16
(52) U.S. Cl. .............................. 725/36; 725/67; 725/70; 725/146
(58) Field of Search ........................... 348/906, 722, 348/473, 10, 13, 7, 12; 455/6.2, 6.3, 4.2, 5.1; 725/36, 35, 34, 33, 32, 63, 146, 67, 70

(56) References Cited

U.S. PATENT DOCUMENTS

| | | | |
|---|---|---|---|
| 5,099,319 | * | 3/1992 | Esch et al. .............................. 358/86 |
| 5,216,515 | * | 6/1993 | Steele et al. .......................... 358/335 |
| 5,515,098 | * | 5/1996 | Carles ....................................... 348/8 |
| 5,600,364 | * | 2/1997 | Hendricks et al. ....................... 348/1 |
| 5,635,978 | * | 6/1997 | Alten et al. .............................. 348/7 |
| 5,841,433 | * | 11/1998 | Chancy ................................ 345/327 |

* cited by examiner

Primary Examiner—Chris Grant
(74) Attorney, Agent, or Firm—Lerner, David, Littenberg, Krumholz & Mentlik, LLP

(57) ABSTRACT

The present invention which involves a digital broadcasting system provides a digital broadcasting method in which change information NETQ for indicating the broadcast content change is transmitted a certain period of time in advance by a primary transmission system when the primary transmission system broadcasts programs. As the result, a secondary transmission system, for example, a cable television system which reedits and rebroadcasts the programs received from a digital satellite broadcasting system, can easily and quickly rearrange the air time in response to the change such as program content change in the rebroadcasting in the secondary transmission system.

34 Claims, 4 Drawing Sheets

DIGITAL BROADCASTING SYSTEM AND DIGITAL BROADCASTING METHOD

BACKGROUND OF THE INVENTION

1. Field of the Invention

This invention relates to a digital broadcasting system and a digital broadcasting method, and is applied to transmit programs from a primary transmission system such as a digital satellite broadcasting system to a secondary transmission system such as a cable television system. In detail, when a broadcast program is transmitted from a primary transmission system to a secondary transmission system, change information which indicates the content change of program is transmitted from the primary transmission system to the secondary transmission system a certain period of time in advance of the schedule time of a program corresponding to the change information so that the secondary transmission system can easily and quickly respond to the prolongation of air time of a program in broadcasting.

2. Description of Related Art

Heretofore, in the terrestrial broadcasting, the program switching is informed from a key station to network stations by use of net Q-data inserted in the vertical interval time code of video signal in advance so that network station can rearrange commercial programs.

On the other hand, in the digital satellite broadcasting system which is the primary transmission system, the program specific information (PSI), which is the selection reference of service, is broadcast at a certain time interval to broadcast the electronic program guide (EPG) so that a desired channel is selected easily from among many channels.

The PSI is the selection reference data for selecting a channel by use of video data and audio data, and consists of four tables: a program association table (PAT), a program map table (PMT), a conditional access table (CAT), and a network information table (NIT), and various descriptors. PAT, among these tables, is loaded with the packet ID of PMT and the packet ID of NIT corresponding to the channel number of the broadcast program (in this case, identical with the service ID (SID)), and PMT is loaded with the packet ID of video data and audio data which are components of respective programs.

The PSI is structured so that the packet ID to which video data and audio data of a desired program are assigned is easily detected by detecting a packet ID corresponding to the channel number of the desired program from the PAT after the packet ID of PMT is detected from PAT to detect PMT.

On the other hand, CAT is used for transmission of chargeable broadcast information. The frequency of transponder, which is physical information of the transmission line, is recorded on NIT. The PSI is structured so that broadcast by another transponder is received with reference to the NIT and a desired program is received resultantly when the program desired by a user is not broadcast by the transponder which is now being received.

On the other hand, the electronic program guide EPG is used for on-screen display of scheduled broadcast programs.

In the case of digital satellite broadcasting system, broadcast programs are transmitted from a primary transmission system which is a digital satellite broadcasting system to secondary transmission systems which are cable television systems like the relationship between a key station and network stations in the field of terrestrial broadcasting. In this case, the multi-channel service is provided from a digital satellite broadcasting system which is a primary transmission system and the multi-channel service is provided to viewers of a secondary transmission system which is a cable television provider.

However, when the broadcasting schedule is changed immediately before broadcasting due to prolongation of the air time in a digital satellite broadcasting system which is a primary transmission system, it could be difficult for the secondary transmission system side to respond easily and quickly to the prolongation of the air time of the primary broadcasting system unless the broadcasting schedule is changed in the cable television side which is a secondary transmission system because the program is broadcast according to the original broadcasting schedule in the secondary transmission system and the information is not transmitted smoothly from the primary transmission system to the secondary transmission system.

In such case, a method in which program switching is informed in advance by use of net Q-data as used in terrestrial broadcasting could be an alternative, but net Q-data inserted in the vertical interval time code can not be transmitted in the digital satellite broadcasting differently from in the terrestrial broadcasting. Another method in which program switching is detected with reference to the PSI could be an alternative, but the processing timing is too late when program switching is detected by the PSI because the PSI changes synchronously with the program switching. Yet another method in which the electronic program guide EPG is used could be an alternative, but it is difficult to respond to prolongation of air time.

SUMMARY OF THE INVENTION

The present invention was accomplished to solve the above-mentioned problem, in the case that the information such as programs is transmitted from a digital satellite broadcasting system which is a primary transmission system to a cable television broadcasting system which is a secondary transmission system, the present invention provides a digital broadcasting system and a digital broadcast method which is capable of responding easily and quickly to prolongation of air time.

To solve the above-mentioned problem, in the present invention, change information for indicating the content change of broadcasting which has been multiplexed together with the data string of the plurality of programs is provided to a secondary transmission system a certain period of time in advance of the scheduled time of the program corresponding to the change information.

The data string is broadcast based on a multiplexed change information for indicating the content change of broadcasting transmitted together with the data string in the secondary transmission system.

Change information for indicating the content change of broadcasting which has been multiplexed together with the data string of the plurality of programs is provided to a secondary transmission system a certain period of time in advance of the scheduled time of the program corresponding to the change information.

Because change information for indicating the content change of broadcasting which has been multiplexed together with the data string of the plurality of programs is provided to a secondary transmission system a certain period of time in advance of the scheduled time of the program corresponding to the change information, the secondary transmission system can detect the broadcast content change in advance and rearrange the air time.

Because the data string is broadcast based on a multiplexed change information for indicating the content change of broadcasting transmitted together with the data string in the secondary transmission system and the change information is transmitted in advance of the actual time of the change, the secondary transmission system can detect the broadcast content change in advance and rearrange the air time.

Because change information for indicating the content change of broadcasting which has been multiplexed together with the data string of the plurality of programs is provided to a secondary transmission system a certain period of time in advance of the scheduled time of the program corresponding to the change information, the secondary transmission system can rearrange the air time in response to the program content change based on the change information which the secondary transmission system has received in advance.

DETAILED DESCRIPTION OF THE PREFERRED EMBODIMENTS

Embodiments of the present invention will be described in detail hereinafter with reference to the drawings.

(1-1) Whole Configuration

Figure 2:
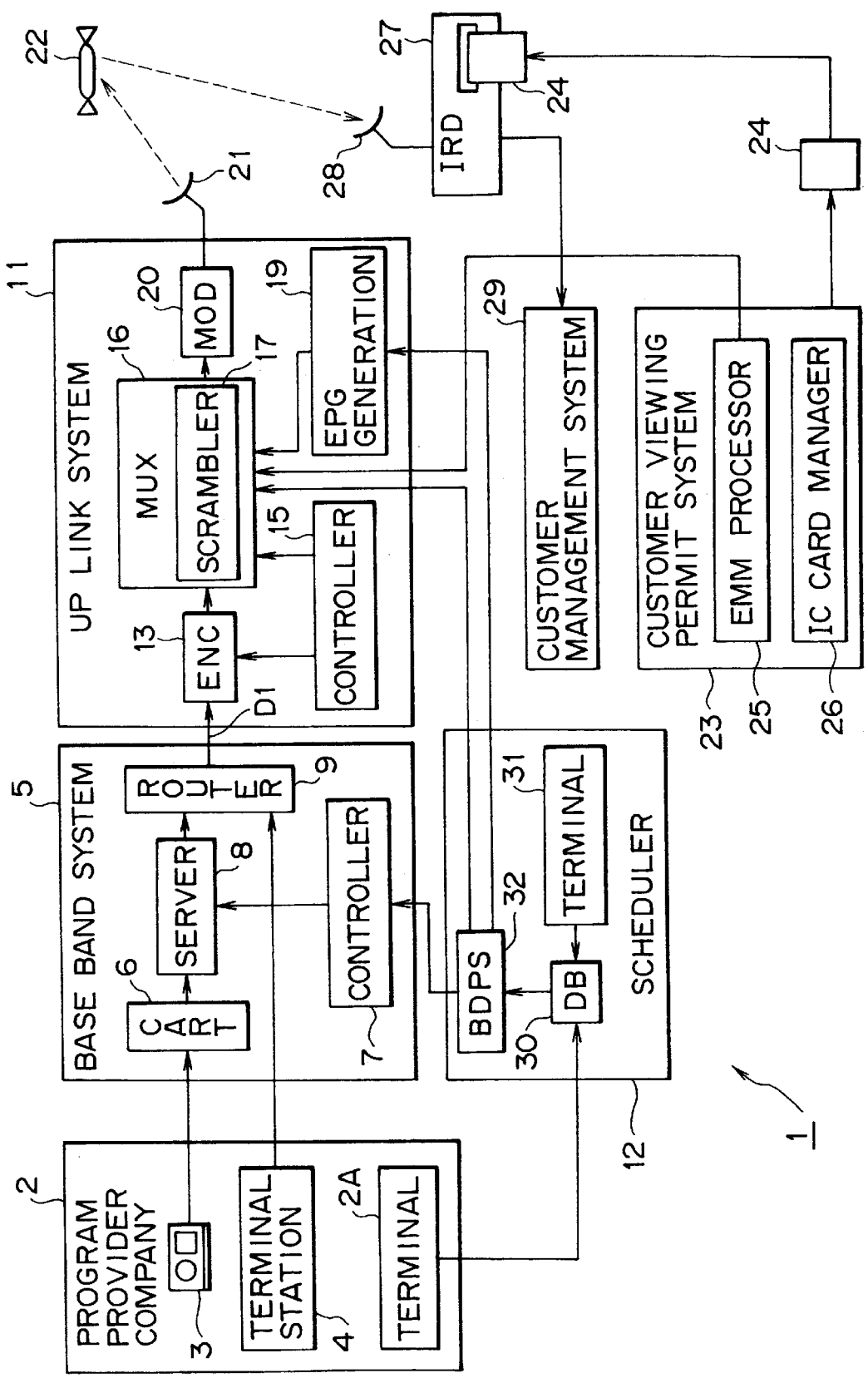
FIG. 2 is a block diagram for illustrating the whole structure of the digital satellite broadcasting system shown in FIG. 1.

FIG. 2 is a block diagram for illustrating the relation between a broadcasting facility of a primary transmission system which is a digital satellite broadcasting system in accordance with the present embodiment and a home receiving appliance. In the digital satellite broadcasting system 1, a program provider company 2 is the nucleus component for providing various services by use of the digital satellite broadcasting system 1, and provides video data and audio data for service by use of a video tape recorder 3. A terminal station 4 provides news program service composed of video data and audio data. Further, the terminal station 4 transmits broadcast service schedule information through a terminal 2A.

A base band system 5 accumulates services provided from various program provider companies 2, and transmits programs according to a broadcasting schedule. In detail, in the base band system 5, a cart 6 holds many recording media, and records services provided from program provider companies 2 in respective recording media. The cart 6 reproduces respective recording media under control of a controller 7 to provide video data and audio data recorded in respective recording media. A server 8 temporarily holds the data provided from the cart 6, and sends out it under control of the controller 7. A router 9 sends out the output data of the server 8 and various data D1 supplied from the terminal station 4 of the program provider company 2 to a subsequent up link system 11. The controller 7 comprises a computer, and controls the operation of the whole base band system 5 according to the broadcasting schedule set by a scheduler 12.

The up link system 11 codes various respective data supplied from the base band system 5, time division multiplexes it to generate multiplexed data, and frequency multiplexes the multiplexed data to up link. In detail, in the up link system 11, an encoder (ENC) 13 codes various data D1 supplied from the base band system 5 to generate coded data.

The multiplexer (MUX) 16 time division multiplexes the coded data under control of controller 15 to generate multiplexed data. At that time, a built-in scrambler 17 scrambles a desired transport stream packet and sends it out. Further, the built-in scrambler 17 generates packets of the program specific information (PSI), the entitlement control message (ECM) of the program itself, and the entitlement management message (EMM) and multiplexes them. Further, the built-in scrambler 17 multiplexes the electronic program guide (EPG) supplied from the EPG generating circuit 19. Then, further, the multiplexer (MUX) 16 separately scrambles the entitlement control message ECM of the program itself and the entitlement management message EMM and multiplexes them.

Herein, the entitlement control message ECM of the program itself is formed of scrambled key data, and the entitlement management message EMM is formed of data required to acquire key data from the entitlement control message ECM of the program itself.

The scrambler 17 comprises a flip-flop series connection circuit and an exclusive-OR circuit for calculating an exclusive OR of a desired row output of the series connection circuit and input data, and feeds back the desired row output of the series connection circuit and the exclusive-OR circuit output to the input row of the series connection circuit, scrambles the input data by setting respective bits of at least key data to the respective flip-flops with a predetermined period and sends them out.

The EPG generating circuit 19 generates data of the electronic program guide EPG under control of the scheduler 12 and sends them out. A modulation circuit (MOD) 20 adds an error code to the multiplexed data supplied from the multiplexer 16, and QPSK (Quadrature Phase Shift Keying) modulates to generate a modulated signal. In the up link system 11, the plurality of series of processing circuits generate respective modulated signals, and these plurality of modulated signals are frequency multiplexed. Further, these frequency multiplexed signals are up linked to a satellite 22 by way of an antenna 21.

The satellite 22 frequency coverts these up linked broadcast waves and down links them.

A customer viewing permit system 23 issues IC cards 24 to respective users who view programs provided from the digital satellite broadcasting system, and acquires the entitlement management message EMM based on the IC card 24. In the customer viewing permit system 23, an EMM processor 25 generates an entitlement management message EMM data and sends it out to the up link system 11. The customer viewing permit system 23 thereby distributes the entitlement management message EMM to users by use of broadcast wave. Further, an EMM processor 25 generates original data required for each user to receive the entitlement management message EMM according to the entitlement contract content of each user, and an IC card manager 26 issues an IC card 24 in which the original data is recorded.

An integrated receiver decoder (IRD) 27 receives broadcast wave down liked from the satellite 22 through an antenna 28, and acquires a desired service from the broadcast wave. At that time, the IRD 27 acquires the entitlement management message EMM from the broadcast wave based on the original data recorded in the IC card 24, and descrambles the entitled program according to the entitlement management message EMM and receives the entitled program. Further, the IRD 27 informs the viewing result to a customer management system 29 though a telephone line as required.

The customer management system 29 executes processing such as charging to respective users based on viewed result informed from the IRD 27 according to the reception entitlement contract.

The scheduler 12 controls the operation in the whole system based on broadcasting schedule information provided from the program provider company 2. In detail, in the scheduler 12, a database (DB) 30 stores broadcasting schedule information, and a terminal 31 supplies the broadcasting schedule information separately. A broadcast data processing system (BDPS) 32 generates management data for transmission of a program based on the broadcasting schedule information registered in the database 30, and controls the base band system 5 based on the data. The broadcast data processing system 32 generates the data required to generate packet of the PSI and the entitlement control message ECM of the program itself based on the data, and informs the multiplexer 16 of the up link system 11 of the data. Further, the broadcast data processing system 32 generates the data required to generate the electronic program guide EPG and informs the EPG generating circuit 19 of it.

Figure 3:
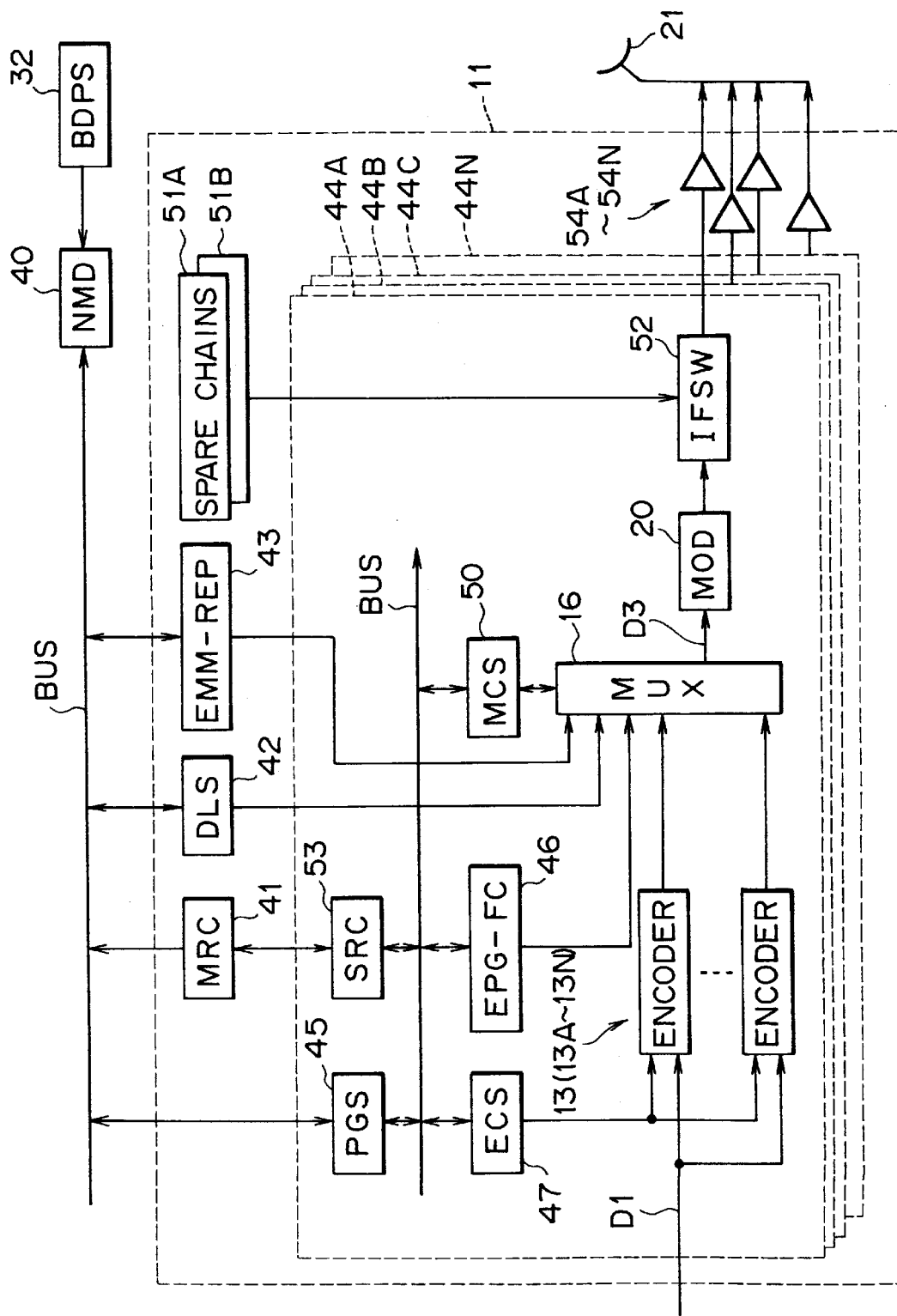
FIG. 3 is a block diagram for illustrating the up link system shown in FIG. 2.

FIG. 3 is a block diagram for illustrating the up link system 11 together with peripheral components. Herein, an NMD (Network Management Database) 40 receives the broadcasting schedule information from the broadcast data processing system 32, sends out the data of electronic program guide EPG and the data of schedule selected from among the broadcasting schedule information to a bus (BUS), and distributes these data to the base band system 5, up link system 11, and customer management system 29.

In the up link system 11, an MRC (Master Redundant Controller) 41 comprises a computer for controlling the operation of the whole up link system 11, and when the MRC receives an anomaly is informed from a lower order component, the MRC switches to a spare component which performs the processing to be performed by the malfunctioning component as required. As described herein above, the MRC 41 takes on the principal role in the controller 15 described with reference to FIG. 2.

A DLS (Download Server) 42 sends out version up data of the IRD 27. An EMM repeater (EMM-REP) 43 acquires the entitlement management message EMM data from the customer viewing permit system 23 through a bus (BUS), and sends out the entitlement management message EMM data to the multiplexer 16 based on the data.

Chains 44A to 44N have the same structure, and codes the output data D1 of the base band system 5 by use of coding process suitable for each broadcast, and then time division multiplexes it to generate multiplexed data. Further, the multiplexed data is QPSK (Quadrature Phase Shift Keying) modulated and sent out.

In detail, for example in the chain 44A, a PGS (Program Guide System) 45 receives the data supplied from the broadcast data processing system 32 through the bus (BUS), and generates schedule data of the service to be sent out from the chain 44A. Further, according to the schedule data, the PGS 45 generates the data required to generate packet of the PSI, and informs it to the multiplexer 16 through a MCS 50. Further, the PGS informs the multiplexer 16 similarly of the data required to generate packet of the entitlement control message ECM of the program itself, and informs an EPG-FC (EPG Flow Controller) 46 of the data required to generate the electronic program guide EPG.

An encoder control subsystem (ECS) 47 controls the operation of the encoder 13 based on the schedule data generated by the PGS 45. The encoder 13 comprises a plurality of series of encoders 13A to 13N and the encoder control subsystem 47 controls the operation of the respective encoders 13A to 13N. The respective encoders 13A to 13N receive output data D1 of the base band system 5, code the output data and provide them to the multiplexer 16. Prescribed some encoders selected from among the encoders 13A to 13N code video data and audio data according to coding system specified by MPEG (Moving Picture Experts Group) and sends them out.

The EPG-FC 46 generates the data of electronic program guide EPG from the data required to generate the electronic program guide informed from the PGS 45 and sends it out.

An MCS (Multiplexer Control Subsystem) 50 controls the operation of the multiplexer 16 based on the schedule data supplied from the PGS 45. Further, the MCS 50 informs the multiplexer 16 of the PSI data sent out from the PGS 45 and the entitlement control message ECM data of the program itself.

As described herein above, the multiplexer 16 generates the transport stream packet based on the output data of the encoders 13A to 13N and multiplexes them, and inserts the packet of the PSI and the packet of the scrambled entitlement control message ECM of the program itself and the entitlement management message EMM in the multiplexed data D3 formed by multiplexing. Further, in the modulation circuit 20, an error code is added to the multiplexed data D3 of the multiplexer 16 for QPSK modulation.

Spare chains 51A and 51B have the same structure as that of one of the chains 44A to 44N, and are ready for performing processing instead of any of the chains 44A to 44N as required.

An intermediate frequency switch (IF SW) 52 selectively provides the QPSK modulated signal supplied from the spare chain 51A or 51B or the QPSK modulated signal supplied from the modulation circuit 20.

An SRC (Sub Redundant Controller) 53 is a spare component to be used instead of the PGS 45. Up converters 54A to 54N frequency convert the frequency of the QPSK modulated signals supplied from the respective chains 44A to 44N to respective assigned frequencies and send them out. The up link system 11 adds the output signals of the respective up converters 54A to 54N and assigns the respective chains 44A to 44N to transponders to frequency multiplex the QPSK modulated signals, and up links from the antenna 21.

Figure 4:
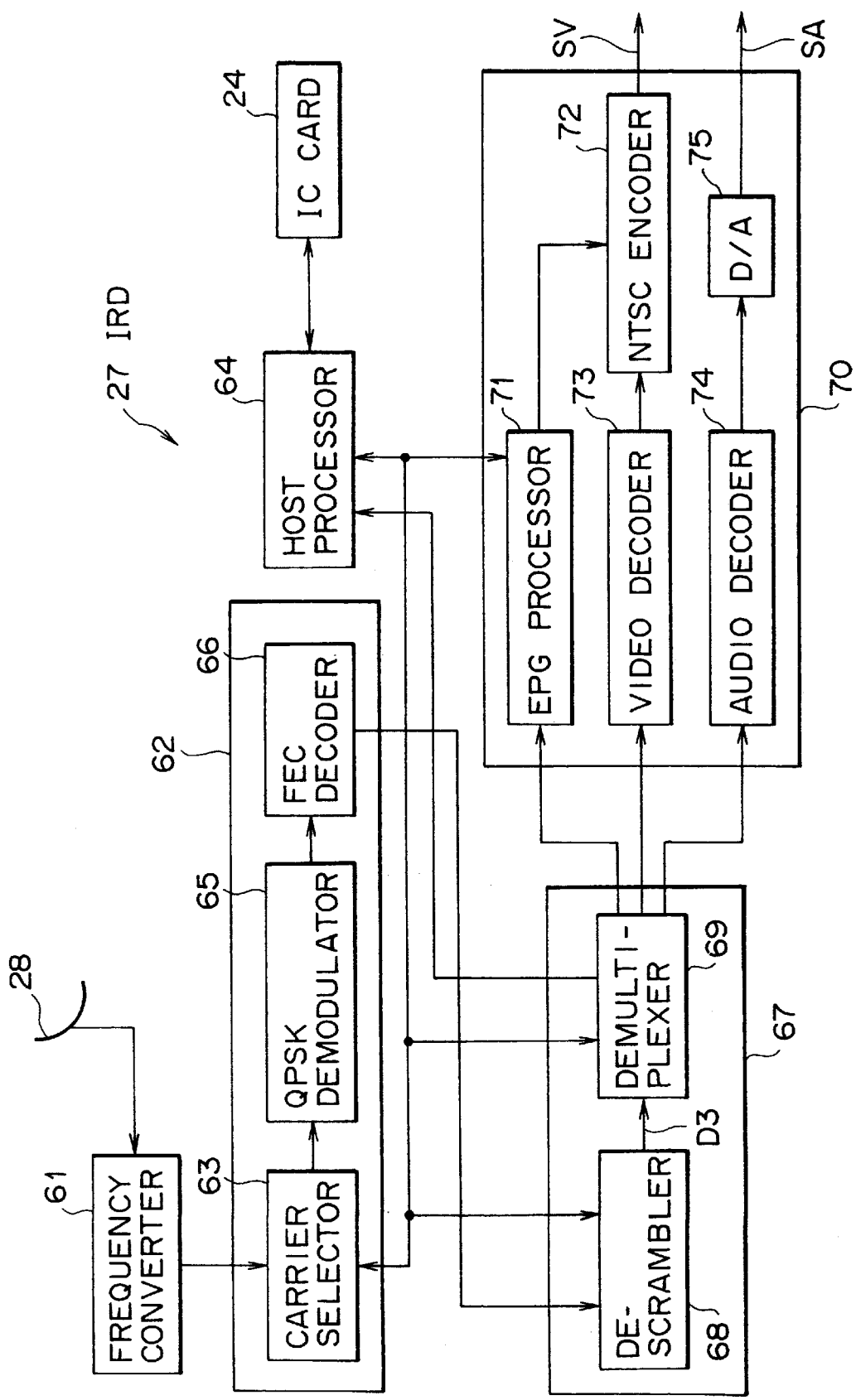
FIG. 4 is a block diagram for illustrating the IRD shown in FIG. 2.

FIG. 4 is a block diagram for illustrating the IRD. In the IRD 27, a frequency converter 61 frequency converts the frequency of the broadcast wave obtained from the antenna 28 and sends out the frequency converted broadcast wave. A front end 62 selectively processes the broadcast wave of the desired transponder from the output of the frequency converter 61, and demodulates the multiplexed data sent out by the transponder and sends it out.

In detail, in the front end 62, a carrier selector 63 switches the local oscillation frequency under control of a host processor 64 and selects the broadcast wave of the desired transponder from among the output signal of the frequency converter 61, and converts the selected broadcast wave to an intermediate frequency signal for sending out.

A QPSK demodulator 65 detects the intermediate wave signal supplied from the carrier selector 63 and generates the multiplexed data on which an error correction signal is added. An FEC decoder 66 performs error correction processing (FEC: Forward Error Correction) of the QPSK demodulator 65 to thereby send out the multiplexed data D3.

A transporter 67 descrambles the multiplexed data as required under control of the host processor 64 and subsequently selects a desired packet to thereby demultiplex the multiplexed data to the original data string. In detail, in the transporter 67, a descrambling circuit 68 provides the multiplexed data supplied from the front end 62 to the subsequent demultiplexer 69, and at that time, descrambles the multiplexed data under control of the host processor 64.

The descrambling circuit 68 comprises a flip-flop series connection circuit and an exclusive-OR circuit for calculating the exclusive OR of the desired row output of the series connection circuit and input data and feeds back the desired row output of the series connection circuit and the output of the exclusive-OR circuit to the input row of the series connection circuit, and descrambles the entitlement management message EMM by setting the original data of the IC card 24 to the series connection circuit. In the circuit having the same structure, the entitlement control message ECM of the program itself is descrambled to acquire the key data by setting the data acquired from the entitlement management message EMM and the original data, and further the scrambled entitled program is descrambled by setting the key data.

A demultiplexer 69 selects a transport stream packet having the packet ID specified by the host processor 64 and sends out from the original data string. At that time, the demultiplexer 69 informs the host processor 64 of the packet information because the PSI is assigned to the packet having the packet ID value of 0. Similarly, the demultiplexer 69 detects the packet of the entitlement control message ECM of the program itself and the entitlement management message EMM, and informs the host processor 64 of the packet information. Further, the demultiplexer 69 judges the attribute of the data assigned to the respective packets with reference to the stream ID added to the respective packets together with the packet ID, and sends them out to a subsequent decoder 70.

The decoder 70 processes the output data of the transporter 67 to generate the video signal SV and the audio signal SA. In detail, in the decoder 70, an EPC processor 71 receives the data assigned to the packet of the electronic program guide EPG from the transporter 67 and informs the host processor 64 of the data, and generates a image data from the data under control of the host processor 64. The image data generates a displayed image for displaying the electronic program guide. The EPG processor 71 provides the image data to an NTSC encoder 72.

A video decoder 73 receives the video data from the demultiplexer 69, and decodes the video data and provides to the NTSC encoder 72. An audio decoder 74 receives the audio data from the demultiplexer 69, and decodes the audio data for sending out. The NTSC encoder 72 selectively processes the image data supplied from the EPG processor 71 and the video data supplied from the video decoder 73 under control of the host processor 64, and provides the NTSC video signal SV. A digital/analog conversion circuit (D/A) 75 performs digital/analog conversion processing of the audio data supplied from the audio decoder 74 and generates the audio signal SA.

The IC card 24 sends out the original data required to scramble the entitlement management message EMM under control of the host processor 64, and the recorded content is updated by the host processor 64.

The host processor 64 comprises a computer for controlling the operation of the IRD 27, issues a control command to carrier selector 63 correspondingly to the operation of a joy stick or remote commander not shown in the drawing to receive the broadcast wave of the desired transponder selectively. Further, the host processor 64 holds the PSI supplied from the demultiplexer 69 in the built-in memory, and when the version of the PSI is updated, the held content is updated correspondingly to the PSI supplied from the demultiplexer 69.

The host processor 64 issues a control command to the NTSC encoder 72 in response to a user operation to thereby display on a screen the electronic program guide EPG, and switches the display. Further, the host processor 64 issues a control command to the carrier selector 63 and the demultiplexer 69 based on the PSI held in the built-in memory correspondingly to a user on-screen selection operation or correspondingly to a channel number which is entered by operation of the joy stick. The host processor 64 thereby switches the packet to be selected by the demultiplexer 69 and switches the transponder to be received so that the program of the channel desired by the user is selected.

As described herein above, to receive a desired channel and select a descrambled program, the original data of the IC card is set to the descrambling circuit 68 to descramble the scrambled entitlement management message. Further, the host processor 64 receives the entitlement management message EMM data from the demultiplexer 69 and the descrambling circuit 68 descrambles the entitlement control message ECM of the program itself based on the entitlement management message EMM data, and the host processor 64 acquires a corresponding key data KS of the program from the entitlement control message ECM of the program itself. Further, the host processor 64 sets the key data KS to the descrambling circuit 68 to thereby descramble the desired packet.

Further, the host processor 64 monitors the version of the entitlement management message EMM and the entitlement control message ECM of the program itself which have been descrambled and supplied from demultiplexer 69 as described herein above, and if the version is updated, then the host processor 64 acquires a new corresponding key data of the program from the entitlement management message EMM and the entitlement control message ECM of the program itself, and sets them to the descrambling circuit 68.

On the other hand, if a key data of a desired channel can not be acquired, then the host processor 64 issues a control command to the NTSC encoder 72 and the audio decoder 74 to thereby indicate muting so that a demodulation result is not generated. Further, the host processor 64 controls the operation of the NTSC encoder 72 so as to display a message of no reception because of no entitlement on a monitor.

Further, if some charge is required for receiving the service, the host processor 64 informs the customer management system 29 through, for example, the telephone line.

(1-2) Retransmission System

Figure 1:
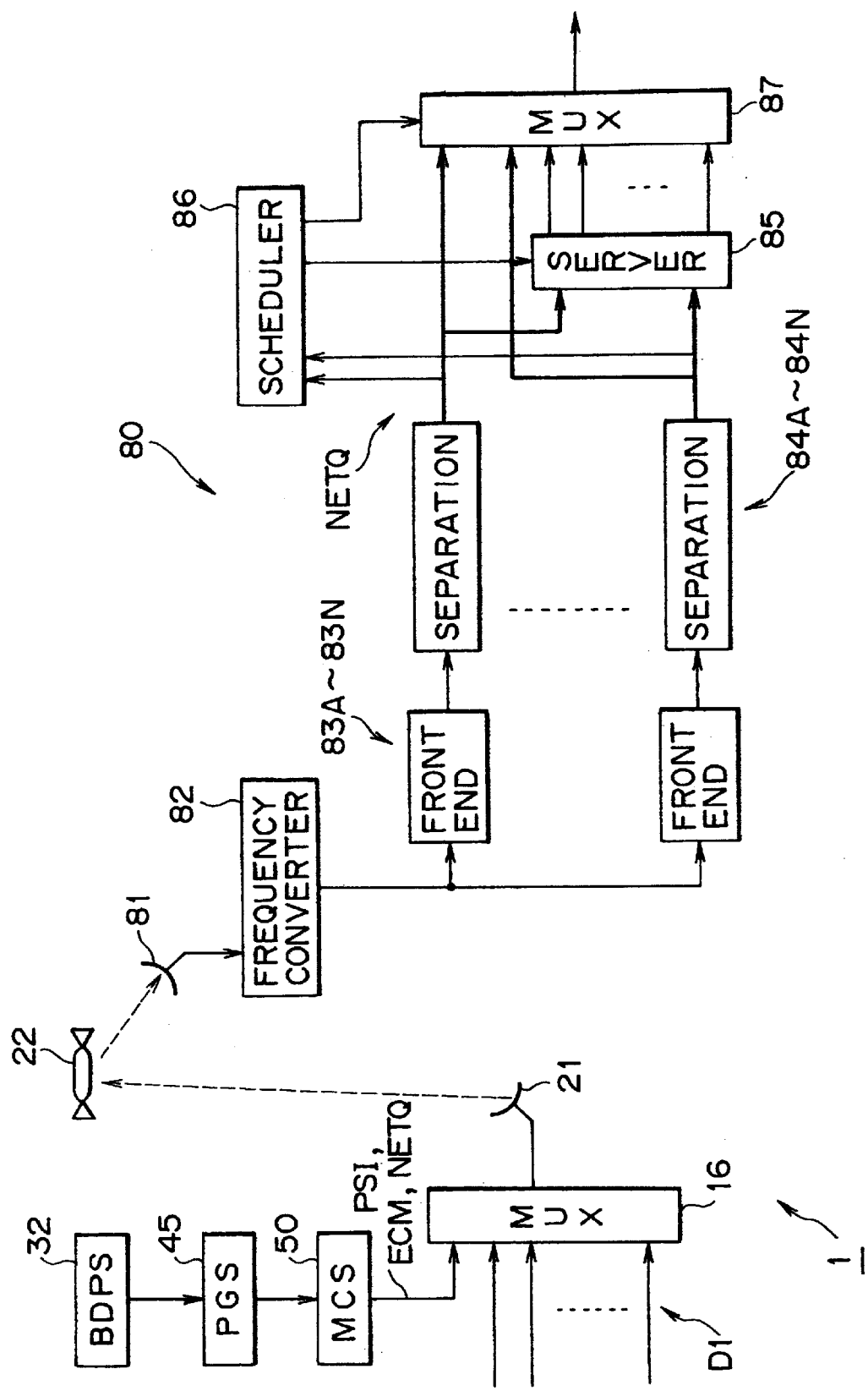
FIG. 1 is a block diagram for illustrating a retransmission system which comprises a digital satellite broadcasting system in accordance with an embodiment of the present invention.

FIG. 1 is a block diagram for illustrating a retransmission system of programs by means of the digital satellite broadcasting system. The retransmission system receives multi-channel programs to be broadcast to general viewers and retransmits programs to homes through, for example, a cable television line.

In detail, in the digital satellite broadcasting system 1, the MCS 50 informs the multiplexer 16 of the above-mentioned PSI data and the entitlement control management ECM data of the program itself, and generates change information NETQ of a program of each transponder. The change information NETQ is the advance information to inform of the change of service transmitted from the transponder and includes a service ID of the service to be changed, the content of the change such as ending and starting of the program, and the schedule time change, and is transmitted by a packet of the private section which is not specified for the digital satellite broadcasting system of this type.

The MCS 50 generates change information NETQ based on the PSI, sends out the change information NETQ to the multiplexer 16 prior to the change starting time. As described herein above, the primary broadcasting facility informs in advance a secondary transmission system of information for indicating the program change together with other data D1 for respective transponders.

The secondary transmission facility 80 converts the frequency of the input signal of the antenna 81 to a predetermined frequency by means of the frequency converter 82. The front ends 83A to 83N selectively process the broadcast wave of the respective predetermined transponders based on the output signal of the frequency converter 82, and demodulate multiplexed data supplied from the transponders for sending out.

Separation circuits 84A to 84N select the transport stream packet of the program to be served for retransmission from among the multiplexed data supplied from respective front ends 83A to 83N to provide them to the server 85 and multiplexer 87. At that time, the separation circuits 84A to 84N select the data of the program change information NETQ with reference to the packet ID set to the respective transport stream packets, and provides the program change information NETQ to the scheduler 86.

The server 85 holds the data of the transport stream packets which are supplied successively under control of the scheduler 86 and provides them to the multiplexer 87. The multiplexer 87 multiplexes the output data of the server 85 and the output data of the separation circuits 84A to 84N under control of the scheduler 86. The secondary transmission facility 80 modulates the output data of the multiplexer 87 and provides them to the secondary transmission path of a coaxial cable.

The scheduler 86 controls the operation of the server 85 and the multiplexer 87 according to the preset schedule by operating a terminal not shown in the drawing to thereby broadcast the program received from the antenna 81. At that time, the scheduler 86 controls the operation of the server 85 and the multiplexer 87 by properly changing the preset schedule based on the program change information NETQ acquired from the respective separation circuits 84A to 84N.

In detail, in the case of a baseball game relay broadcasting, when a commercial message is inserted irregularly, the starting of a commercial message to be inserted irregularly is detected in advance by means of the scheduler 86. The scheduler 86 executes the event set in advance of the starting time of the detected commercial message and thereby sends out the commercial message held in the server 85 instead of a commercial message supplied from the separation circuits 84A to 84N. Even if the commercial message is broadcast irregularly, the commercial message broadcast by the satellite 22 is replaced with the desired commercial message.

Similarly based on the program change information NETQ, by executing the event of the preset schedule, for example, in the case that the air time of a program is prolonged, the air time of following programs is moved down successively.

(2) Operation of the Embodiment

In the digital satellite broadcasting system 1 (FIG. 2) having the structure described hereinbefore, a program prepared by the program provider company 2 is provided to the base band system 5, a broadcasting schedule is provided to the scheduler 12, and a schedule to control the operation of the base band system 5 and up link system 11 is set according to the broadcasting schedule.

In detail, in the base band system 5, video data and audio data which are held temporarily in the cart 6 are sent out to the up link system 11 through the server 8 and router 9 according to the broadcasting schedule. The video data and audio data D1 (FIG. 3) are coded by means of the encoders 13A to 13N in the up link system 11, and then time division multiplexed by means of the multiplexer 16. The time division multiplexed data is modulated by means of the subsequent modulation circuit 20 and frequency multiplexed so as to be up linked, and broadcast from the satellite.

On the other hand on the receiving side (FIG. 4), the broadcast wave received through the antenna 28 is frequency converted by means of the frequency converter 61 and a desired modulated signal is selected from the frequency multiplexed broadcast wave in the front end 62, and the original multiplexed data is demodulated. Further, the time division multiplexed video data and audio data from the demodulated multiplexed data are converted to the original data string and processed by means of the subsequent MPEG decoder 70, and demodulated video signal SV and audio signal SA are generated.

The packet ID is assigned to video data and audio data transmitted as described herein above in multiplexing, the PSI which indicates the corresponding relation between the packet ID and the channel is inserted with a predetermined interval as the program selection reference data, and the multiplexed data D3 is generated.

In the receiving side correspondingly to the above-mentioned operation, the frequency of the transponder to which a desired program is assigned with reference to the PSI and the packet ID of the program is detected, the frequency of the modulated signal to be selected by the front end 62 is switched based on the detection result, and the packet to be separated by the transporter 67 is switched. As the result, it is possible to easily select a desired program from among a plurality of programs which have been multiplexed and transmitted based on the program selection reference data.

On the other hand, the digital satellite broadcasting system 1 generates the program change information NETQ for respective transponders from the PSI and multiplexes the program change information NETQ together with other data prior to the broadcasting content change for sending out to the secondary transmission system (FIG. 1).

On the other hand in the secondary transmission facility 80, the multiplexed data supplied from the respective transponders are decoded and then accumulated in the server 85 as required, the decoded data are multiplexed by means of the multiplexer 87, and the program transmitted through the satellite 22 is broadcast. The program change information NETQ is demodulated for the respective transponders, and the program change information data is provided to the scheduler 86.

In the series of processing, the program to be broadcast from the secondary transmission system is sent out according to the schedule held in the scheduler 86, and the schedule is changed properly according to the change information NETQ. In detail, for example in the case of baseball game relay broadcasting, the starting time of a commercial message, which is to be inserted irregularly, is detected in advance by means of the scheduler 86, the event of the schedule is executed at the starting time of the detected commercial message, and the commercial message held in the server 85 is thereby sent out instead of the commercial message supplied from the separation circuits 84A to 84N.

As the result, even if the commercial message is broadcast irregularly, the commercial message broadcast from the satellite 22 is replaced with the desired commercial message.

Similarly, by executing the event set to the schedule according to the change information NETQ, the air time of the program is moved down successively as required when the broadcasting program is prolonged.

(3) Effect of the Embodiment

According to the structure described herein above, by transmitting the change information for indicating the broadcast content change a certain period of time in advance from the primary transmission system when the program is broadcast from the primary transmission system, the broadcasting from the secondary transmission system can be rearranged easily and quickly correspondingly to the prolonged air time.

(4) Another Embodiment

In the above-mentioned embodiment, the case in which the program change information is sent out for respective transponders is described, however the present invention is no by means limited to the case, and the program change information for all the transponders may be sent out together.

In the above-mentioned embodiment, the case in which video signal and audio signal are broadcast is described, however the present invention is by no means limited to the case, and for example, the present invention may be applied widely to the case in which only audio signal is broadcast.

Further, in the above-mentioned embodiment, the case in which time division multiplexed various programs are broadcast is described, however the present invention is by no means limited to the case, and the present invention may be applied widely to, for example, frequency multiplexed broadcasting.

Further, in the above-mentioned embodiment, the case in which the present invention is applied to a digital satellite broadcasting system is described, however the present invention is by no means limited to the case, and the present invention may be applied widely to various digital broadcasting systems such as cable television system.

Further, in the above-mentioned embodiment, the case in which programs are transmitted from a primary transmission system which is a digital satellite broadcasting system to a secondary transmission system which is a cable television system, however the transmission may be real time transmission or so-called time shift transmission, in which transmission from a primary transmission system to a secondary transmission system is delayed by a certain period of time.

According to the present invention as described hereinbefore, by transmitting change information for indicating the content change of broadcasting from a primary transmission system a certain period of time in advance of the schedule time of the program corresponding to the change information when the program is broadcast from the primary transmission system, the broadcasting in the secondary transmission system can be rearranged easily and quickly so as to follow the change such as prolongation of air time.

What is claimed is:

1. A method for transmitting programs from a primary transmission system to a secondary transmission system, comprising:

providing a first schedule for transmitting from said primary transmission system to said secondary transmission system first data corresponding to a first program;

transmitting said first data from said primary transmission system to said secondary transmission system in accordance with said first schedule;

providing a second schedule for transmitting from said secondary transmission system to subscribers of said secondary transmission system second data corresponding to a second program, said second schedule being based upon said first schedule;

during said transmitting of said first data in accordance with said first schedule, modifying said first schedule to provide a modified first schedule;

generating at said primary transmission system change data indicating said modified schedule;

multiplexing at said primary transmission system said change data with said first data to provide a multiplexed data stream;

transmitting said multiplexed data stream from said primary transmission system to said secondary transmission system;

demultiplexing at said secondary transmission system said multiplexed data stream to provide said change data;

modifying at said secondary transmission system said second schedule based upon said change data to provide a modified second schedule; and transmitting said second data from said secondary transmission system to said subscribers based upon said modified second schedule.

2. The method of claim 1, wherein said primary transmission system is a digital satellite broadcasting system and said secondary transmission system is a cable television system.

3. The method of claim 1, wherein said multiplexed data stream is formatted into data packets in accordance with the MPEG standard.

4. The method of claim 3, wherein said change data are incorporated into private sections of said data packets.

5. The method of claim 1, wherein said second program is a retransmission in real time of said first program.

6. The method of claim 1, wherein said second program is a replacement for a segment of said first program.

7. The method of claim 6, wherein said replacement is a commercial stored at said secondary transmission system.

8. The method of claim 1, wherein said transmitting of said multiplexed data stream occurs before said transmitting of said second data.

9. The method of claim 1, wherein said change data identifies said first program and a modified ending time for said first program.

10. The method of claim 1, wherein said change data identifies a starting time and an ending time for an unscheduled segment of said first program.

11. A system for transmitting programs from a primary transmission system to a secondary transmission system, comprising:

a first scheduler at said primary transmission system for preparing a first schedule for transmitting from said primary transmission system to said secondary transmission system first data corresponding to a first program;

one or more first transmitters at said primary transmission system for transmitting said first data from said primary transmission system to said secondary transmission system in accordance with said first schedule;

a second scheduler at said secondary transmission system for preparing a second schedule for transmitting from said secondary transmission system to subscribers of said secondary transmission system second data corresponding to a second program, said second schedule being based upon said first schedule;

a processor at said primary transmission system for generating, during said transmitting of said first data in accordance with said first schedule, change data indicating a modification of said first schedule;

a multiplexer at said primary transmission system for multiplexing said change data with said first data to provide a multiplexed data stream, said one or more first transmitters transmitting said multiplexed data stream from said primary transmission system to said secondary transmission system;

a demultiplexer at said secondary transmission system for demultiplexing said multiplexed data stream and providing said change data to said second scheduler, said second scheduler modifying said second schedule based upon said change data to provide a modified second schedule; and one or more second transmitters at said secondary transmission system for transmitting said second data from said secondary transmission system to said subscribers based upon said modified second schedule.

12. The system of claim 11, wherein said primary transmission system is a digital satellite broadcasting system and said secondary transmission system is a cable television system.

13. The system of claim 11, wherein said multiplexer formats said multiplexed data stream into data packets in accordance with the MPEG standard.

14. The system of claim 13, wherein said multiplexer inserts said change data into private sections of said data packets.

15. The system of claim 11, wherein said second program is a retransmission in real time of said first program.

16. The system of claim 11, wherein said second program is a replacement for a segment of said first program.

17. The system of claim 16, wherein said replacement is a commercial stored at said secondary transmission system.

18. The system of claim 11, wherein said one or more first transmitters transmit said multiplexed data stream before said one or more second transmitters transmit said second data.

19. The system of claim 11, wherein said change data identifies said first program and a modified ending time for said first program.

20. The system of claim 11, wherein said change data identifies a starting time and an ending time for an unscheduled segment of said first program.

21. A method for transmitting programs from a primary transmission system to a secondary transmission system, comprising:

providing a schedule for transmitting from said primary transmission system to said secondary transmission system first data corresponding to a first program;

transmitting a data stream from said primary transmission system to said secondary transmission system in accordance with said schedule, said data stream containing said first data and second data identifying said schedule;

during said transmitting of said data stream, modifying said schedule to provide a modified schedule;

generating at said primary transmission system change data indicating said modified schedule;

inserting into said data stream said change data; and transmitting from said primary transmission system to said secondary transmission system said data stream containing said first data, said second data and said change data.

22. The method of claim 21, wherein said primary transmission system is a digital satellite broadcasting system and said secondary transmission system is a cable television system.

23. The method of claim 21, wherein said data stream is formatted into data packets in accordance with the MPEG standard.

24. The method of claim 23, wherein said change data are incorporated into private sections of said data packets.

25. The method of claim 21, wherein said inserting of said change data into said data stream occurs before said modified schedule becomes effective.

26. The method of claim 21, wherein said change data identifies said first program and a modified ending time for said first program.

27. The method of claim 21, wherein said change data identifies a starting time and an ending time for an unscheduled segment of said first program.

28. A system for transmitting programs from a primary transmission system to a secondary transmission system, comprising:

a scheduler at said primary transmission system for preparing a schedule for transmitting from said primary transmission system to said secondary transmission system first data corresponding to a first program;

one or more transmitters at said primary transmission system for transmitting a data stream from said primary transmission system to said secondary transmission system in accordance with said schedule, said data stream containing said first data and second data identifying said schedule;

a processor at said primary transmission system for generating, during said transmitting of said data stream in accordance with said first schedule, change data indicating a modification of said first schedule; and a multiplexer at said primary transmission system for inserting into said data stream said change data, said one or more transmitters transmitting from said primary transmission system to said secondary transmission system said data stream containing said first data, said second data and said change data.

29. The system of claim 28, wherein said primary transmission system is a digital satellite broadcasting system and said secondary transmission system is a cable television system.

30. The system of claim 28, wherein said multiplexer formats said data stream into data packets in accordance with the MPEG standard.

31. The system of claim 30, wherein said multiplexer inserts said change data into private sections of said data packets.

32. The system of claim 28, wherein said multiplexer inserts said change data into said data stream before said modified schedule becomes effective.

33. The system of claim 28, wherein said change data identifies said first program and a modified ending time for said first program.

34. The system of claim 28, wherein said change data identifies a starting time and an ending time for an unscheduled segment of said first program.

* * * * *

UNITED STATES PATENT AND TRADEMARK OFFICE
CERTIFICATE OF CORRECTION

PATENT NO. : 6,266,813 B1
DATED : July 24, 2001
INVENTOR(S) : Kiichi Ihara

Page 1 of 1

It is certified that error appears in the above-identified patent and that said Letters Patent is hereby corrected as shown below:

<u>Title page, Item [54], and Column 1, lines 1 and 2,</u>
"DIGITAL BROADCASTING SYSTEM AND DIGITAL BROADCASTING METHOD" should read -- SYSTEM AND METHOD FOR MODIFYING A BROADCASTING SCHEDULE --.

Signed and Sealed this

Nineteenth Day of March, 2002

Attest:

JAMES E. ROGAN
*Director of the United States Patent and Trademark Office*

*Attesting Officer*